United States Patent
Murschall et al.

(10) Patent No.: US 6,872,461 B2
(45) Date of Patent: Mar. 29, 2005

(54) MATT, FLAME-RETARDANT, CO-EXTRUDED POLYESTER FILM, A METHOD FOR THE PRODUCTION THEREOF AND THE USE OF THE SAME

(75) Inventors: Ursula Murschall, Nierstein (DE); Ulrich Kern, Ingelheim (DE); Guenther Crass, Taunusstein (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/181,791

(22) PCT Filed: Jan. 10, 2001

(86) PCT No.: PCT/EP01/00212

§ 371 (c)(1),
(2), (4) Date: Jul. 18, 2002

(87) PCT Pub. No.: WO01/53090

PCT Pub. Date: Jul. 26, 2001

(65) Prior Publication Data

US 2003/0087105 A1 May 8, 2003

(30) Foreign Application Priority Data

Jan. 20, 2000 (DE) .......................... 100 02 161

(51) Int. Cl.[7] .................. B32B 27/08; B32B 27/18; B32B 27/36
(52) U.S. Cl. ................ 428/480; 428/910; 528/293; 528/294; 528/295; 528/302; 528/305; 528/308; 528/308.5; 525/437; 525/444; 525/448; 106/15.05; 106/18.11; 106/18.14; 106/18.18; 106/18.31
(58) Field of Search ................. 428/480, 910; 528/293, 294, 295, 302, 305, 308, 308.5; 525/437, 444, 448; 106/15.05, 18.11, 18.14, 18.18, 18.31

(56) References Cited

U.S. PATENT DOCUMENTS

| 3,563,942 A | 2/1971 | Heiberger |
| 3,779,993 A | 12/1973 | Kibler et al. |
| 4,102,853 A * | 7/1978 | Kawamura et al. ......... 524/425 |
| 4,252,885 A | 2/1981 | McGrail et al. |
| 4,399,179 A | 8/1983 | Minami et al. |
| 4,493,872 A | 1/1985 | Funderburk et al. |
| 4,578,596 A | 3/1986 | Tihanyi et al. |
| 5,073,435 A | 12/1991 | Eyraud et al. |
| 5,173,357 A * | 12/1992 | Nakane et al. ............... 428/220 |
| 5,674,947 A * | 10/1997 | Oishi et al. .................. 525/289 |
| 5,955,181 A * | 9/1999 | Peiffer et al. ................ 428/212 |
| 5,972,445 A * | 10/1999 | Kimura et al. ............... 428/35.4 |
| 6,270,888 B1 * | 8/2001 | Rutter et al. ................ 428/347 |
| 6,358,604 B1 * | 3/2002 | Peiffer et al. ................ 428/336 |
| 2002/0068158 A1 * | 6/2002 | Peiffer et al. ................ 428/220 |
| 2002/0068159 A1 * | 6/2002 | Peiffer et al. ................ 428/220 |
| 2002/0071945 A1 * | 6/2002 | Peiffer et al. ................ 428/220 |
| 2002/0114944 A1 * | 8/2002 | Peiffer et al. ................ 428/336 |
| 2002/0127414 A1 * | 9/2002 | Peiffer et al. ................ 428/447 |
| 2003/0087105 A1 * | 5/2003 | Murschall et al. ........ 428/423.7 |
| 2003/0108754 A1 * | 6/2003 | Murschall et al. .......... 428/480 |
| 2003/0108755 A1 * | 6/2003 | Murschall et al. .......... 428/480 |

FOREIGN PATENT DOCUMENTS

| DE | 23 46 787 A1 | 3/1975 |
| EP | 0 144 878 A2 | 6/1985 |
| EP | 0 144 978 A2 | 6/1985 |
| EP | 0 296 620 A2 | 12/1988 |
| EP | 0 584 044 A1 | 2/1994 |
| EP | 0 587 148 A2 | 3/1994 |
| EP | 0 602 964 A1 | 6/1994 |
| EP | 0826 478 A2 | 3/1998 |
| EP | 0 976 548 A2 | 2/2000 |
| EP | 0 976 548 * | 2/2000 |
| GB | 2 344 596 * | 6/2000 |
| JP | 2000-052523 * | 2/2000 |
| WO | WO 94/13481 A1 | 6/1994 |
| WO | WO 98/06575 * | 2/1998 |

OTHER PUBLICATIONS

Schimtz, Peter et al., "Films." Ullmann's Encyclopedia of Industrial Chemistry, 5th Ed., vol. A11 (1988), pp. 85–95, 108–110.*

Werner, Eberhard et al., "Polyester, Films." Encyclopedia of Polymer Science and Engineering, vol. 12 (1988), pp. 193–216.*

* cited by examiner

Primary Examiner—Vivian Chen
(74) Attorney, Agent, or Firm—ProPat, L.L.C.

(57) ABSTRACT

The invention relates to a co-extruded, biaxially oriented polyester films containing a flame-retardant agent which can be dissolved in the polyester. The film has a matt outer layer which contains a mixture and/or a blend of two components (I) and (II), whereby component (I) is a polyethylene terephthalate homopolymer, or a polyethylene terephthalate copolymer, or a mixture of polyethylene terephthalate homopolymers or copolymers and component (II) is a polymer containing at least one sulphonate group.

16 Claims, No Drawings

MATT, FLAME-RETARDANT, CO-EXTRUDED POLYESTER FILM, A METHOD FOR THE PRODUCTION THEREOF AND THE USE OF THE SAME

The invention relates to a biaxially oriented polyester film with a base layer composed of at least 70% by weight of a thermoplastic polyester and comprising at least one flame retardant, and with at least one matt outer layer which comprises a mixture or, respectively, a blend made from two components I and II. The invention further relates to the use of the film and to a process for its production.

Component I of the mixture or blend is a polyethylene terephthalate homopolymer or polyethylene terephthalate copolymer, or a mixture of polyethylene terephthalate homo- or copolymers.

Component II of the mixture or blend is a polyethylene terephthalate copolymer which is composed of the condensation product of the following monomers or, respectively, of their derivatives capable of forming polyesters: isophthalic acid, aliphatic dicarboxylic acid, sulfomonomer which contains a metal sulfonate group on the aromatic moiety of an aromatic dicarboxylic acid, and aliphatic or cycloaliphatic glycol.

The outer layer of the invention has a characteristic matt surface or appearance and is very suitable for use in constructing exhibition stands or as packaging film or for industrial applications, in particular where a requirement is flame retardancy to DIN 4102.

BACKGROUND OF THE INVENTION

There is high industrial demand for transparent, high-gloss plastic films, e.g. biaxially oriented propylene films or biaxially oriented polyester films. There is also an increasing demand for transparent films of this type which are flame retardant and which have at least one surface layer which is not high-gloss but has a characteristic matt appearance and therefore, for example, is effective for promotional purposes in the construction of exhibition stands or provides the packaging with an appearance which is particularly attractive and therefore effective for promotional purposes.

U.S. Pat. No. 4,399,179 describes a coextruded biaxially oriented polyester film which is composed of a transparent base layer and of at least one matt layer which essentially consists of a certain polyethylene terephthalate copolymer and also comprises inert particles with a diameter of from 0.3 to 20 μm at a concentration of from 3 to 40%. The specific copolymer is a processing aid which reduces the viscosity of the melt comprising the inert particles, thus permitting satisfactory extrusion of that layer. The mattness of the film is achieved by adding the inert particles to the appropriate layer.

EP-A 0 144 978 describes a self-supporting oriented film made from thermoplastic and, on at least one of its two surfaces, bearing a continuous polyester coating which is applied as aqueous dispersion to the film prior to the final stretching step. The polyester coating is composed of a condensation product of various monomers which are capable of forming polyesters, such as isophthalic acid, aliphatic dicarboxylic acids, sulfomonomers, and aliphatic or cycloaliphatic glycols.

DE-A 2346 787 describes a flame-retardant polymer. Besides the polymer, the use of the polymer to produce transparent films and fibers is also described. When films were produced from this the phospholane-modified polymer the following shortcomings were apparent:

The polymer is very susceptible to hydrolysis and has accordingly to be very effectively predried. When the polymer is dried with commercial dryers it cakes, however, and production of a film is therefore possible only under very difficult conditions. The films produced, under extreme and uneconomic conditions, also embrittle on exposure to heat. The deterioration in mechanical properties is so severe as to make the film unusable. This embrittlement occurs after as little as 48 hours of exposure to heat.

The prior art gives no indication as to how at least one surface of a film can be given low gloss while retaining high film transparency, where the film is also flame-retardant to DIN 4102 and does not embrittle after exposure to heat.

It was an object of the present invention, therefore, to provide a polyester film which has at least one matt surface, where this is flame-retardant to DIN 4102, and is simple and cost-effective to produce, and has the good physical properties of the known films, does not pose problems of disposal, and does not embrittle after exposure to heat.

BRIEF DESCRIPTIONS OF THE INVENTION

This object is achieved by means of a coextruded, biaxially oriented polyester film, the characterizing features of which are that it comprises flame retardant which is soluble in the polyester and which is fed by way of masterbatch technology during film production, and has a matt outer layer which comprises a mixture or, respectively, a blend made from two components I and II.

DETAILED DESCRIPTION OF THE INVENTION

Flame retardancy means that in what is known as a fire protection test the film complies with the conditions of DIN 4102 Part 2 and in particular the conditions of DIN 4102 Part 1 and can be allocated to construction materials class B2 and in particular B1 for low-flammability materials.

The film is also intended to pass the UL 94 test "Vertical Burning Test for Flammability of Plastic Material", thus permitting its allocation to class 94 VTM-0. This means that the film has ceased to burn 10 seconds afer removal of the Bunsen burner, and that after 30 seconds no smoldering is observed, and moreover no burning drops are observed.

Component I of the mixture or blend is a polyethylene terephthalate homopolymer or polyethylene terephthalate copolymer, or a mixture made from polyethylene terephthalate homo- or copolymers.

Component II of the mixture or blend is a polymer containing at least one sulfonate group, in particular a condensation product of the following monomers or of their derivatives capable of forming polyesters:
A) from 65 to 95 mol % of isophthalic acid;
B) from 0 to 30 mol % of at least one aliphatic dicarboxylic acid of the formula

where n is from 1 to 11;
C) from 5 to 15 mol % of at least one sulfomonomer containing an alkali metal sulfonate group on the aromatic moiety of a dicarboxylic acid;
D) an aliphatic or cycloaliphatic glycol having from 2 to 11 carbon atoms, in the amount necessary to form 100 mol % of condensate; where each of the percentages given is based on the total amount of the monomers forming component II.

The good mechanical properties include high modulus of elasticity ($E_{MD}$>3200 N/mm$^2$; $E_{TD}$>3500 N/mm$^2$) and also good values for tensile strength at break (in MD>100 N/mm²; in TD>130 N/mm²).

Good orientability includes the capability of the film to give excellent orientation both longitudinally and transversely during its production, without break-offs.

For the purposes of the present invention, mixtures are mechanical mixtures prepared from the separate components. For this, the separate constituents are generally combined in the form of small-dimensioned compressed mouldings, e.g. lenticular or bead-shaped pellets, and mixed with one another mechanically, using a suitable agitator. Another way of producing the mixture is to feed components I and II in pellet form separately to the extruder for the outer layer of the invention, and to carry out mixing in the extruder and/or in the downstream melt-transportation systems.

For the purposes of the present invention, a blend is an alloy-like composite of the separate components I and II which can no longer be separated into the initial constituents. A blend has properties like those of a homogeneous material, and can therefore be characterized by appropriate parameters.

Cost-effective production includes the capability of the raw materials or raw material components needed for producing the flame-retardant film to be dried using commercial industrial dryers, such as vacuum dryers, fluidized-bed dryers or fixed-bed dryers (tower dryers). It is important that the raw materials do not cake or undergo thermal degradation. These dryers operate at temperatures from 100 to 170° C., at which the skilled worker expects flame-retardant polymers to cake and the dryers and/or extruders to become blocked so that the carbonized mass has to be removed by force, making film production impossible. In the case of the vacuum dryer, which has the gentlest drying action, the raw material passes through a range of temperatures from about 30 to 130° C. at a subatmospheric pressure of 50 mbar. This has to be followed by what is known as post-drying in a hopper at temperatures from 100 to 130° C. with a residence time of from 3 to 6 hours. Even here, the flame-retardant polymers prepared according to the prior art cake to an extreme extent.

No embrittlement on short exposure to heat means that after 100 hours of controlled heating at 100° C. in a circulating-air drying cabinet the film has not embrittled—i.e. the film does not break on folding—and does not have poor mechanical properties. Mechanical properties remain unaltered after the controlled heating procedure.

According to the invention, the flame retardant is fed by way of what is known as masterbatch technology directly during film production, the concentration of the flame retardant here advantageously being from 0.5 to 30% by weight, preferably from 1 to 20% by weight, based on the weight of the layer of the crystallizable thermoplastic. It is important that the flame retardant is soluble in the polyester. The flame retardant is preferably present in the base layer. It may also be provided in the outer layers and/or intermediate layers, if required.

The film of the invention has at least two layers. The layers which it then encompasses are a layer B (=base layer) and the outer layer A of the invention. In one preferred embodiment of the invention, the film has a three-layer structure, and has the outer layer A on one side of the layer B and has another layer C on the other side of the layer B. In this case, the two layers A and C form the outer layers A and C. According to the invention, the UV absorber may be present in the outer layer(s) and/or in the base layer.

The base layer B of the film is preferably composed of at least 70% by weight of a thermoplastic polyester. Polyesters suitable for this purpose are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT), or else made from ethylene glycol, naphthalene-2,6-dicarboxylic acid and biphenyl-4,4'-dicarboxylic acid (=polyethylene 2,6-naphthalate dibenzoate, PENBB). Particular preference is given to polyesters at least 90 mol %, preferably at least 95 mol %, of which is composed of ethylene glycol units and terephthalic acid units, or of ethylene glycol units and naphthalene-2,6-dicarboxylic acid units. The remaining monomer units derive from those other aliphatic, cycloaliphatic or aromatic diols and dicarboxylic acids. Other examples of suitable aliphatic diols are diethylene glycol, triethylene glycol, aliphatic glycols of the formula HO—(CH$_2$)$_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—C$_6$H$_4$—X—C$_6$H$_4$—OH, where X is —CH$_2$—, —C(CH$_3$)$_2$—, —C(CF$_3$)$_2$—, —O—, —S— or —SO$_2$—. Bisphenols of the formula HO—C$_6$H$_4$—C$_6$H$_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the C$_3$-C$_{19}$ alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids and the diols.

At least one outer layer of the multilayer film of the invention comprises a mixture or, respectively, a blend made from two components I and II and described in more detail below, and, where appropriate, comprises additives.

Component I of the outer layer mixture or of the blend essentially consists of a thermoplastic polyester, in particular the polyester described in more detail above for the base layer. A method which has proven successful here for achieving a high degree of mattness is to use a polyester of comparatively low viscosity for component I of the outer layer of the invention. To describe the viscosities of the melts use is made of a modified solution viscosity (SV). The SVs of commercially available polyethylene terephthalates suitable for producing biaxially oriented films are in the range from 500 to 1200. A method which has proven successful for obtaining a high degree of film mattness for the purposes of the present invention is to use polymers whose SV is in the range from 500 to 800, preferably in the range from 500 to 750, particularly preferably in the range from 500 to 700, for component I of the outer layer of the invention.

As stated above, component II of the outer layer mixture is obtained by condensation of the following monomers or of their derivatives capable of forming polymers:
A) isophthalic acid;
B) if appropriate, an aliphatic dicarboxylic acid of the formula

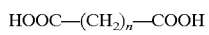
HOOC—(CH$_2$)$_n$—COOH where
n is in the range from 1 to 11,
C) a sulfomonomer containing an alkali metal sulfonate group on the aromatic moiety of a dicarboxylic acid;
D) an aliphatic or cycloaliphatic glycol having from 2 to 11 carbon atoms, in the amount needed to form 100 mol % of condensate; where each of the percentages given is based on the total amount of the monomers forming component II.

Examples of dicarboxylic acids suitable as component B) of the copolyesters are malonic, adipic, azelaic, glutaric, sebacic, suberic, succinic and brassylic acid, and also mixtures of these acids or their derivatives capable of forming polyesters. Of the abovementioned acids, sebacic acid is preferred.

Examples of sulfomonomers which contain a metal sulfonate group on the aromatic moiety of an aromatic dicarboxylic acid (component C) are monomers of the following formula:

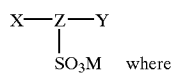
X—Z—Y
|
SO$_3$M    where

M is a monovalent cation of an alkali metal,
Z is a trivalent aromatic radical, and
X and Y are carboxy groups or polyester-forming equivalents.

Monomers of this type are described in U.S. Pat. Nos. 3,563,942 and 3,779,993. Examples of monomers of this type are the sodium salts of sulfoterephthalic acid, of 5-sulfoisophthalic acid, of sulfophthalic acid, of 5-(p-sulfophenoxy)isophthalic acid, or of 5-sulfopropoxyisophthalic acid, and similar monomers, and also derivatives of these, such as the dimethyl esters, capable of forming polyesters. M is preferably Na$^+$, Li$^+$, or K$^+$.

The term "derivatives capable of forming polyesters" here means reaction participants with groups capable of condensation reactions, in particular transesterification reactions, to form polyester bonds. Groups of this type include carboxy groups. They also include the lower alkyl esters of these, e.g. dimethyl terephthalate, diethyl terephthalate, and numerous other esters, halides, and salts. The acid monomers are preferably used in the form of dimethyl esters, since this permits better control of the condensation reaction.

Examples of glycols suitable as component D) are ethylene glycol, 1,5-pentanediol, 1,6-hexanediol, neopentyl glycol, 1,10-decanediol, cyclohexanedimethanol, and similar substances. It is preferable to use ethylene glycol.

The copolyesters may be prepared by known polymerization techniques. The procedure is generally to combine the acid components with glycol and to heat these in the presence of an esterification catalyst, with subsequent addition of a polycondensation catalyst.

The quantitative ratios of components A, B, C, and D used to prepare the mixtures of the invention have been found to be decisive for obtaining the matt outer layer. For example, at least about 65 mol % of isophthalic acid (component A) has to be present as acid component. Component A is preferably from about 70 to 95 mol % of pure isophthalic acid.

As far as component B is concerned, any acid with the formula mentioned gives satisfactory results, and preference is given to adipic acid, azelaic acid, sebacic acid, malonic acid, succinic acid, glutaric acid, and mixtures of these acids. The desired amount within the range given is preferably from 1 to 20 mol %, based on the acid components of the mixture II, if component B is present in the composition.

The amount of the glycol component present is stoichiometric.

The copolyesters suitable for the purposes of the invention also have an acid value below 10, preferably from 0 to 3, an average molecular weight below about 50,000, and an SV in the range from about 30 to 700, preferably from about 350 to 650.

The ratio (ratio by weight) of the two components I and II of the outer layer mixture or blend may vary within wide limits and depends on the intended use of the multilayer film. The ratio of components I and II is preferably in the range from I:II=10:90 to I:II=95:5, preferably from I:II= 20:80 to I:II=95:5, and in particular from I:II=30:70 to I:II=95:5.

The film of the invention comprises at least one flame retardant, fed by way of what is known as masterbatch technology directly during film production, the concentration of the flame retardant being in the range from 0.5 to 30.0% by weight, preferably from 1.0 to 20.0% by weight, based on the weight of the layer of the crystallizable thermoplastic. The ratio by weight of flame retardant to thermoplastic usually maintained when producing the masterbatch is in the range from 60:40 to 10:90.

Typical flame retardants include bromine compounds, chloroparaffins and other chlorine compounds, antimony trioxide, and alumina trihydrates, but the halogen compounds are disadvantageous due to the halogen-containing by-products produced. Another extreme disadvantage is the low lightfastness of any film provided with these, and also the evolution of hydrogen halides in the event of a fire.

Examples of suitable flame retardants used according to the invention are organophosphorus compounds, such as carboxyphosphinic acids, anhydrides of these, and dimethyl methylphosphonate. It is important for the invention that the organophosphorus compound is soluble in the thermoplastic, since otherwise compliance with the required optical properties is lacking.

Since the flame retardants generally have some degree of susceptibility to hydrolysis, the additional use of a hydrolysis stabilizer can be advisable.

The hydrolysis stabilizers generally used are phenolic stabilizers, alkali metal/alkaline earth metal stearates, and/or alkali metal/alkaline earth metal carbonates, in amounts of from 0.01 to 1.0% by weight. The amount used of phenolic stabilizers is preferably from 0.05 to 0.6% by weight, in particular from 0.15 to 0.3% by weight, and their molar mass is preferably more than 500 g/mol. Pentaerythrityl tetrakis-3-(3,5-di-tert-butyl-4-hydroxyphenyl)propionate or 1,3,5-trimethyl-2,4,6-tris(3,5-di-tert-butyl-4-hydroxybenzyl) benzene is particularly advantageous.

Besides the flame retardant fed by way of masterbatch technology, the base layer and/or the outer layer(s) may also comprise conventional additives, such as stabilizers and antiblocking agents. They are advantageously added to the polymer or polymer mixture before melting begins.

Examples of stabilizers used are phosphorus compounds, such as phosphoric acid or phosphoric esters. Typical antiblocking agents (also termed pigments in this context) are inorganic and/or organic particles, such as calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, the calcium, barium, zinc, or manganese salts of the dicarboxylic acids used, carbon black, titanium dioxide, kaolin, or polymer particles, such as crosslinked polystyrene particles or crosslinked acrylate particles.

Additives selected may also be mixtures of two or more different antiblocking agents, or mixtures of antiblocking agents of the same composition, but with different particle sizes. The usual concentration of the particles may be added to each of the layers, e.g. in the form of a glycolic dispersion during polycondensation or by way of masterbatches during extrusion. Pigment concentrations which have proven particularly suitable are from 0.0001 to 10% by weight, based on the weight of the outer layers. Addition of these particles to the outer layer A of the invention gives another advantageous opportunity of varying the degree of mattness of the film. Increase in pigment concentration is generally associated with an increase in the degree of mattness of the film. An example of a detailed description of antiblocking agents is found in EP-A 0 602 964.

The present invention also provides a process for producing this film. It encompasses
a) producing a film from base and outer layer(s) by coextrusion,
b) biaxial orientation of the film, and
c) heat-setting of the oriented film.

It is important for the invention that the masterbatch which comprises the flame retardant and, where appropriate, the hydrolysis stabilizer is precrystallized or predried. This predrying includes gradual heating of the masterbatch at subatmospheric pressure (from 20 to 80 mbar, preferably from 30 to 60 mbar, in particular from 40 to 50 mbar), with stirring, and, where appropriate, post-drying at constant increased temperature, again at subatmospheric pressure. The masterbatch is preferably charged at ambient temperature from a feed vessel in the required blend together with the polymers of the base and/or outer layers and, where appropriate, with other raw material components batchwise into a vacuum dryer which during the course of the drying or residence time passes through a temperature profile of from 10 to 160° C., preferably from 20 to 150° C., in particular from 30 to 130° C. During a residence time of about 6 hours, preferably 5 hours, in particular 4 hours, the raw material mixture is stirred at from 10 to 70 rpm, preferably from 15 to 65 rpm, in particular from 20 to 60 rpm. The resultant precrystallized or predried raw material mixture is post-dried in a downstream vessel, likewise evacuated, at from 90 to 180° C., preferably from 100 to 170° C., in particular from 110 to 160° C., for from 2 to 8 hours, preferably from 3 to 7 hours, in particular from 4 to 6 hours.

To produce the outer layer of the invention, it is advantageous to feed pellets of mixture component I and pellets of mixture component II in the desired mixing ratio directly to the extruder, where appropriate together with the flame retardant masterbatch which has been predried. It has proven advantageous for extrusion of the matt outer layer of the invention to use a twin-screw extruder, e.g. as described in EP-A 0 826 478. The materials can be melted and extruded at about 300° C. with a residence time of about 5 min. Under these conditions, transesterification reactions can proceed in the extruder, and these can form other copolymers from the homopolymers and the copolymers.

The polymers for the base layer are advantageously fed by way of another extruder, together with the flame retardant masterbatch, which has been predried. Any foreign bodies or contamination present may be filtered out from the polymer melt prior to extrusion. The melts are then extruded through a coextrusion die to give flat melt films and laminated to one another. The multilayer film is then drawn off and solidified with the aid of a chill roll and, where appropriate, other rolls.

The biaxial orientation is generally carried out sequentially or simultaneously. In sequential stretching, it is preferable to orient first longitudinally (i.e. in machine direction) and then transversely (i.e. perpendicularly to machine direction). This leads to orientation of the molecular chains. The longitudinal orientation can be carried out with the aid of two rolls running at different speeds corresponding to the desired stretching ratio. For transverse orientation use is generally in the range made of an appropriate tenter frame. In simultaneous stretching the film is simultaneously stretched longitudinally and transversely in a tenter frame.

The temperature at which the orientation is carried out may vary within a relatively wide range and depends on the desired properties of the film. The longitudinal stretching is generally carried out at from 80 to 130° C. and the transverse stretching at from 90 to 150° C. The longitudinal orientation ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. If desired, the transverse stretching may be followed by another longitudinal orientation, and even by another transverse orientation.

In the heat-setting which follows, the film is held at a temperature of from 150 to 250° C. for from 0.1 to 10 s. The film is then wound up in the usual way.

One or both surfaces of the film may therefore have a coating. The thickness of this coating on the finished film is from 5 to 100 nm, preferably from 20 to 70 nm, in particular from 30 to 50 nm. It is preferably applied in-line, i.e. during the film-production process, advantageously prior to transverse orientation. Application by reverse gravure roll coatings is particularly preferred, and this process permits extremely uniform application of the coating at the layer thickness mentioned. The coatings are applied—preferably by aqueous methods—as solutions, suspensions, or dispersions, and provide the film surface with additional functionality, for example making the film sealable, printable, metallizable, sterilizable, antistatic, or improving its aroma barrier for example, or permitting its adhesion to materials which would not otherwise adhere to the film surface (e.g. photographic emulsions). Examples of substances or compositions which provide additional functionality are:

Acrylates, as described by way of example in WO 94/13476, ethylene-vinyl alcohols, PVDC, waterglass ($Na_2SiO_4$), hydrophilic polyesters (PET/IPA polyesters containing the sodium salt of 5-sulfoisophthalic acid), for example as described in EP-A-0 144 878 or U.S. Pat. No. 4,252,885 or EP-A-0 296 620, vinyl acetates, for example as described in WO 94/13481, polyvinyl acetates, polyurethanes, the alkali metal or alkaline earth metal salts of $C_{10}$–$C_{18}$ fatty acids, and butadiene copolymers with acrylonitrile or methyl methacrylate, methacrylic acid, acrylic acid, or esters thereof.

The compositions or substances mentioned are applied in the form of dilute, preferably aqueous, solution, emulsion, or dispersion to one or both surfaces of the film. The solvent is then evaporated. If the coatings are applied in-line prior to transverse stretching, the heat treatment during transverse stretching and subsequent heat-setting is usually sufficient to evaporate the solvent and dry the coating. The dried coatings then have the abovementioned desired layer thicknesses.

The films may also be coated—preferably in an off-line process—with metals, such as aluminum, or with ceramic materials, such as $SiO_x$ or $Al_xO_y$. This in particular improves their gas-barrier properties.

The polyester film of the invention preferably also comprises a second outer layer C arranged on that side of the base layer B which is opposite to the outer layer A. The structure, thickness, and composition of the second outer layer may be selected irrespective of the other outer layer present, and the second outer layer may likewise comprise the abovementioned polymers, flame retardants, or polymer mixtures for the base layer or the first outer layer of the invention, but these do not have to be identical with those of the first outer layer. The second outer layer may also comprise other commonly used outer layer polymers, while these may also be provided with flame retardant.

If desired, there may also be an intermediate layer between the base layer and the outer layer(s). The intermediate layer may be composed of the polymers described for the base layer. In one particularly preferred embodiment, it is composed of the polyester used for the base layer. It may also comprise the flame retardant described and the conventional additives described. The thickness of the intermediate layer is generally above 0.3 µm, preferably in the range from 0.5 to 15 µm, in particular from 1.0 to 10 µm.

The thickness of the outer layer(s) is generally above 0.1 µm, preferably in the range from 0.2 to 5 µm, in particular from 0.2 to 4 µm, and the thicknesses of the outer layers may be identical or different.

The total thickness of the polyester film of the invention may vary within wide limits and depends on the intended application. It is preferably from 4 to 500 µm, in particular from 5 to 350 µm, with preference from 6 to 300 µm, the base layer preferably making up from about 40 to 90% of the total thickness.

The film of the invention can be recycled without difficulty and without polluting the environment, and is therefore suitable, for example, for use as short-lived advertising placards, in the construction of exhibition stands, and for other short-lived promotional items, where fire protection is desired.

Surprisingly, from a thickness as low as 4 µm the films of the invention comply with construction materials classes B2 and B1 to DIN 4102 Part 2 and Part 1, and also with the UL 94 test. In addition, even after 200 hours of a controlled heating procedure at 100° C. the films show no embrittlement.

Another advantage is that the production costs of the film of the invention are only insignificantly greater than those of a film made from standard polyesters. The other properties of the film of the invention relevant to its processing and use are essentially unaltered or have indeed been improved. In addition, it has been ensured that a proportion of up to 50% by weight, preferably from 10 to 50% by weight, of regrind, based in each case on the total weight of the film, can be reused during production of the film without any significant resultant adverse effect on the physical properties of the film, and in particular without any adverse effect on the Yellowness Index of the film.

It was therefore more than surprising that a flame-retardant and thermoformable film with the required property profile can be produced cost-effectively and without caking in the dryer by using masterbatch technology and suitable predrying and/or precrystallization and, where appropriate, small amounts of a hydrolysis stabilizer, and that the film does not embrittle by exposure to heat and does not break when folded.

It was likewise very surprising that together with this excellent result and with the flame protection required within the accuracy of measurement, there is no adverse effect on the Yellowness Index of the film when comparison is made with a film not provided with flame retardant;

there was no evolution of gases, nor any die deposits, frame condensation, and the film therefore has excellent optical properties and excellent profile and layflat;

the flame-retardant film has excellent stretchability, and can therefore be produced in a reliable and stable manner on high-speed film lines at speeds of up to 420 m/min.

With this, the film is also cost-effective.

The surprising combination of exceptional properties gives the film of the invention excellent suitability for a wide variety of applications, for example for interior decoration, for construction of exhibition stands or for exhibition requisites, as displays, for placards, for protective uses related to machinery or to vehicles, in the lighting sector, in the fitting out of shops or of stores, as a promotional item, or laminating medium, for greenhouses, roofing systems, exterior cladding, protective coverings, applications in the construction sector, and illuminated advertising profiles, blinds, and electrical applications.

The film of the invention also has low gloss, in particular low gloss of film surface A, and comparatively low haze. It also has good winding and processing performance. It is also worthy of mention that the outer layer of the invention is readily inscribable using ballpoint, felt tip, or fountain pen.

The gloss of film surface A is lower than 70. In one preferred embodiment the gloss of this side is lower than 60, and in a particularly preferred embodiment it is less than 50. This means that the character of this film surface is particularly highly effective for promotional purposes, and the surface is therefore particularly suitable as an outer surface of packaging.

The haze of the film is smaller than 40%. In one preferred embodiment the haze of the film is less than 35%, and in one particularly preferred embodiment less than 30%. The comparatively low haze of the film (compared with a matt monofilm, see comparative example) means that the film can be painted for example by reverse printing, and that it is possible to incorporate viewing windows through which, for example, contents can be clearly discerned.

Other application sectors are its use for producing labels, as a release film for producing semifinished GRP products, or as a hot-stamping foil, or as in-mold label.

The table below (Table 1) gives again the most important film properties of the invention.

TABLE 1

|  | inventive range | preferred | particularly preferred | Unit | Test method |
| --- | --- | --- | --- | --- | --- |
| Gloss, side A | <70 | <60 | <50 |  | DIN 67 530 |
| Haze | <40 | <35 | <30 | % | ASTM D1003-52 |
| Construction | complies |  |  |  | DIN 4102 |

TABLE 1-continued

| | inventive range | preferred | particularly preferred | Unit | Test method |
|---|---|---|---|---|---|
| materials class to DIN 4102 | with B1 and B2 | | | | |

The methods used to characterize the polymers and the films were as follows:

Test Methods

DIN=Deutsches Institut für Normung
ISO=International Organization for Standardization
ASTM=American Society for Testing and Materials

SV (DCA), IV (DVE)

Standard viscosity SV (DCA) is measured in dichloroacetic acid by a method based on DIN 53726.

Intrinsic viscosity (IV) is calculated as follows from standard viscosity $$IV(DCA) = 6.67 \cdot 10^{-4} \, SV(DCA) + 0.118$$

Coefficient of Friction

Coefficient of friction is determined to DIN 53 375, 14 days after production.

Surface Tension

Surface tension was determined by what is known as the ink method (DIN 53 364).

Haze

Haze of the film was measured to ASTM D1003-52. The Hölz haze measurement was made by a method based on ASTM D1003-52, but in order to utilize the ideal measurement range was measured on four mutually superimposed laps of film, and a 1° slit diaphragm was used instead of a 4° pinhole.

Gloss

Gloss was determined to DIN 67 530. Reflectance was measured, this being an optical value characteristic of a film surface. Based on the standard ASTM D523-78 and ISO 2813, the angle of incidence was set at 20° or 60°. A beam of light hits the flat test surface at the set angle of incidence and is reflected and/or scattered by the surface. A proportional electrical variable is displayed representing light rays hitting the photoelectric detector. The value measured is dimensionless and must be stated together with the angle of incidence.

Roughness

The roughness $R_a$ of the film was determined to DIN 4768 with cutoff at 0.25 mm.

Fire Performance

Fire performance is determined to DIN 4102 Part 2, construction materials class B2 and to DIN 4102 Part 1, construction materials class B1, and also by the UL 94 test.

The examples below illustrate the invention.

EXAMPLE 1 a) Preparation of Component II for the Outer Layer Mixture of the Invention

A copolyester having 90 mol % of isophthalic acid and 10 mol % of the sodium salt of 5-sulfoisophthalic acid as acid component and 100 mol % of ethylene glycol as glycol component was prepared by the following process:

A stainless steel reaction vessel of 2 l capacity, equipped with an anchor stirrer, a thermal element for measuring the temperature of the vessel contents, an 18 inch Claisen/Vigreux distillation column with condenser and receiver, an inlet opening, and a heating jacket, was preheated to 190° C. and flushed with nitrogen. 1065.6 g of dimethyl isophthalate, 180.6 g of the sodium salt of dimethyl 5-sulfoisophthalate, and 756.9 g of ethylene glycol were placed in the vessel. A buffer ($Na_2CO_3 \cdot 10H_2O$—0.439 g) and a transesterification catalyst ($Mn(OAc)_2 \cdot 4H_2O$—0.563 g) were also placed in the vessel. The mixture was heated with stirring, whereupon methanol distilled off. During the distillation the temperature in the vessel was gradually increased to 250° C. When the distillate weight corresponded to the theoretical methanol yield, an ethylene glycol solution comprising 0.188 g of phosphorous acid was added. The distillation column was replaced by a curved vapor take-off with receiver. 20 g of pure ethylene carbonate were added to the reaction mixture, whereupon vigorous evolution of gas ($CO_2$) began immediately. $CO_2$ evolution subsided after about 10 min. A reduced pressure of 240 mmHg was then applied, and the polycondensation catalyst (0.563 g of $Sb_2O_3$ slurried in ethylene glycol) was added. The reaction mixture was stirred for 10 min while the reduced pressure of 240 mmHg was maintained, and then the pressure was further reduced to from 240 to 20 mmHg in steps of 10 mmHg/min. As soon as the pressure in the system had been reduced to 20 mmHg, the temperature in the vessel was raised from 250 to 290° C. at a rate of 2° C./min. When the temperature in the vessel had reached 290° C. the stirrer speed was throttled back and the pressure was reduced to not more than 0.1 mmHg. At this juncture a read-out was obtained from the stirrer motor using an ammeter. The viscosity of the polymer was controlled by allowing the polycondensation to proceed in accordance with set values for the change in the ampere value from the stirrer motor of (in each case) 2.3 A. When the desired molecular weight had been achieved, nitrogen pressure was applied to the vessel to expel the liquid polymer from the outlet in the base of the vessel into an ice-water quenching bath.

B) Preparation of the Mixture for Outer Layer A of the Invention

75% by weight of component I (polyethylene terephthalate with SV of 680, KOSA, Germany) were fed to the inlet hopper of a twin-screw extruder with 25% by weight of component II, and the two components were extruded together at about 300° C. and fed to the outer layer channel A of a coextrusion die.

Base Layer B:

The flame retardant is metered in the form of a masterbatch into the base layer.

The flame retardant masterbatch is composed of 20% by weight of flame retardant and 80% by weight of polyester. The flame retardant is the organophosphorus compound dimethyl methylphosphonate ®Amgard P1045 from the company Albright & Wilson, which is soluble in the polyester.

The composition of the base layer is as follows:

| | |
|---|---|
| 75% by weight | of polyethylene terephthalate (RT 49 from KoSa GmbH) with SV of 800 and |
| 5% by weight | of masterbatch made from 99% by weight of polyethylene terephthalate (RT49) and 1.0% by weight of silica particles (® Sylobloc 44 H from the company Grace) with average particle size of 4.5 µm |
| 20% by weight | of the flame retardant masterbatch. |

The components of the base layer are charged at room temperature from separate feed vessels into a vacuum dryer which from the juncture of charging until the end of the residence time traverses a temperature profile of from 25 to 130° C. The raw material mixture is stirred at 61 rpm during the residence time of 4 hours.

The precrystallized or predried raw material mixture is post-dried in the downstream hopper, likewise in vacuo, at 140° C. for 4 hours, and fed to the extruder for the base layer.
Outer Layers A and C:

Chips made from polyethylene terephthalate and from a filler were likewise fed to the extruder for the outer layer C. A transparent three-layer film with ABC structure and total thickness 12 μm was then produced by coextrusion followed by stepwise longitudinal and transverse orientation. The thickness of each of the outer layers was 1.5 μm.

Outer layer A:

| | |
|---|---|
| 80% by weight | of component I and |
| 20% by weight | of component II. |

Outer layer C

| | |
|---|---|
| 90% by weight | of polyethylene terephthalate (RT 49 from KoSa GmbH) with SV of 800 and |
| 10% by weight | of masterbatch made from 99% by weight of polyethylene terephthalate (RT49) and 1.0% by weight of silica particles (® Sylobloc 44 H from the company Grace) with an average particle size of 4.5 μm. |

The individual steps of the process were:

| | | | |
|---|---|---|---|
| Longitudinal stretching | Temperature: | | 85–135° C. |
| | Longitudinal stretching ratio: | 4.0:1 | |
| Transverse stretching | Temperature: | | 85–135° C. |
| | Transverse stretching ratio: | 4.0:1 | |
| Setting | Temperature: | | 230° C. |

EXAMPLE 2

In a manner similar to that of Example 1, a three-layer film with a total thickness of 12 μm was produced by coextrusion. Only the composition of outer layer A was changed:
Outer Layer A:
  75% by weight of component I and
  25% by weight of component II.

EXAMPLE 3

A coextruded film was produced using the mixing specification of Example 1, in which the composition of outer layer A was as follows:
  70% by weight of component I and
  30% by weight of component II.

EXAMPLE 4

A coextruded film was produced using the mixing specification of Example 1, in which the composition of outer layer A was as follows:
  60% by weight of component I and
  40% by weight of component II.

COMPARATIVE EXAMPLE

A monofilm was produced and had the composition of outer layer A from Example 3. The film surfaces had the required mattness, but the film did not meet the set requirements because it had excessive haze. It was also very difficult to produce the film by a process which was reliable and therefore cost-effective. Furthermore, the film does not satisfy the conditions of DIN 4102 Part 2 and Part 1.

TABLE 2

| Ex. No. | Compliant with DIN 4102 Part 1 and Part 2 | Film thickness (μm) | Outer layer thickness A/C (μm) | Film structure | Gloss (60° measurement angle) | | Haze |
|---|---|---|---|---|---|---|---|
| | | | | | Side A | Side C | |
| 1 | B1 and B2 | 12 | 1.5/1.5 | ABC | 65 | 175 | 25 |
| 2 | B1 and B2 | 12 | 1.5/1.5 | ABC | 55 | 175 | 26 |
| 3 | B1 and B2 | 12 | 1.5/1.5 | ABC | 45 | 175 | 28 |
| 4 | B1 and B2 | 12 | 1.5/1.5 | ABC | 35 | 175 | 30 |
| CE | | 12 | 1.5 | A | 35 | 160 | 70 |

What is claimed is:

1. A coextruded, biaxially oriented polyester film comprising, as flame retardant, an organophosphorus compound soluble in the polyester, where the film has a matt outer layer which comprises a mixture or a blend or a mixture and a blend made from two components I and II, where component I is a polyethylene terephthalate homopolymer or polyethylene terephthalate copolymer or a mixture made from polyethylene terephthalate homo- or copolymer, and component II is a condensation product of the following monomers or of their derivatives capable of forming polymers or of the following monomers and of their derivatives capable of forming polymers:

A) from about 65 to about 95 mol % of isophthalic acid,
B) from 0 to about 30 mol % of at least one aliphatic dicarboxylic acid of the formula HOOC—(CH$_2$)$_n$—COOH where
n is from 1 to 11;
C) from about 5 to about 15 mol % of at least one sulfomonomer containing an alkali metal sulfonate group on the aromatic moiety of an aromatic dicarboxylic acid;
D) an aliphatic or cycloaliphatic glycol having from 2 to 11 carbon atoms, in the amount necessary to form about 100 mol % of condensate; where each of the percentages given is based on the total amount of the monomers forming component II.

2. The polyester film as claimed in claim 1, wherein the sulfomonomer is a monomer of the following formula:

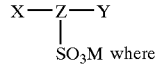
  where

M is a monovalent cation of an alkali metal,
Z is a trivalent aromatic radical, and
X and Y are carboxy groups or polyester-forming equivalents.

3. The polyester film as claimed in claim 1, wherein the ratio of components I and II is in the range from I:II=about 10:about 90 to I:II=about 95:about 5.

4. The polyester film as claimed in claim 1, wherein the flame retardant is soluble in the polyester and is fed directly by way of masterbatch technology during film production, and wherein the masterbatch was obtained by progressive heating at subatmospheric pressure, with agitation.

5. The polyester film as claimed in claim 4, wherein the progressive heating at subatmospheric pressure, with agitation, is directly followed by post-drying at a constant elevated temperature, again at subatmospheric pressure.

6. The polyester film as claimed in claim 1, wherein the flame retardant is selected from one or more organic phosphorus compounds.

7. The polyester film as claimed in claim 6, wherein the flame retardant is dimethyl methylphosphonate.

8. The polyester film as claimed in claim 1, which comprises from about 0.5 to about 30.0% by weight of flame retardant.

9. The polyester film as claimed in claim 1, which has two layers and is composed of a base layer B and of an outer layer A.

10. The polyester film as claimed in claim 1, which has three layers and is composed of a base layer B and of an outer layer A and, respectively, C on each of the opposite surfaces of the base layer B.

11. The polyester film as claimed in claim 1, wherein the machine-direction modulus of elasticity (EMD) is > about 3 200 N/mm$^2$ and the transverse modulus of elasticity (ETD) is > about 3 500 N/mm$^2$.

12. The polyester film as claimed in claim 1, wherein the machine-direction tensile stress at break (MD) is > about 100 N/mm$^2$ and the transverse tensile stress at break (TD) is > about 130 N/mm$^2$.

13. The polyester film as claimed in claim 1, wherein the gloss of at least one film surface is lower than about 70.

14. The polyester film as claimed in claim 1, wherein the haze of the film is smaller than about 40%.

15. A method of making an interior decoration, a display, a placards, a protective glazing, a shop outfit, a promotional requisite, a laminating medium, a roofing system, an exterior cladding, a protective covering, an illuminated advertising profile, or a blind, which comprises converting a film as claimed in claim 1 into an interior decoration, a display, a placards, a protective glazing, a shop outfit, a promotional requisite, a roofing system, a laminating medium, an exterior cladding, a protective covering, an illuminated advertising profile, or a blind.

16. A coextruded, biaxially oriented polyester film comprising a base layer disposed between first and second outer layers, said base layer comprising at least one organophosphorous flame retardant soluble in the polyester, said first outer layer comprising a mixture or a blend or a mixture and a blend made from two components I and II, wherein component I is a polyethylene terephthalate homopolymer or polyethylene terephthalate copolymer or a mixture made from polyethylene terephthalate homo- or copolymer, and component II is a condensation product of the following monomers or of their derivatives capable of forming polymers or of the following monomers and of their derivatives capable of forming polymers:

A) from about 65 to about 95 mol % of isophthalic acid;

B) from 0 to about 30 mol % of at least one aliphatic dicarboxylic acid of the formula $$\text{HOOC—(CH}_2)_n\text{—COOH}$$

where
n is from 1 to 11;

C) from about 5 to about 15 mol % of at least one sulfomonomer containing an alkali metal sulfonate group on the aromatic moiety of an aromatic dicarboxylic acid;

D) an aliphatic or cycloaliphatic glycol having from 2 to 11 carbon atoms, in the amount necessary to form about 100 mol % of condensate;

where each of the percentages given is based on the total amount of the monomers forming component II, wherein said flame retardant is absent from said first and second outer layers.

* * * * *